(12) United States Patent
Schneider

(10) Patent No.: US 9,477,369 B2
(45) Date of Patent: Oct. 25, 2016

(54) SYSTEM, METHOD AND COMPUTER PROGRAM PRODUCT FOR DISPLAYING A RECORD AS PART OF A SELECTED GROUPING OF DATA

(75) Inventor: Elena Schneider, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 603 days.

(21) Appl. No.: 12/945,773

(22) Filed: Nov. 12, 2010

(65) Prior Publication Data

US 2011/0219338 A1    Sep. 8, 2011

Related U.S. Application Data

(60) Provisional application No. 61/311,705, filed on Mar. 8, 2010.

(51) Int. Cl.
| | | |
|---|---|---|
| *G06F 3/048* | (2013.01) | |
| *G06F 17/30* | (2006.01) | |
| *G06F 3/0484* | (2013.01) | |

(52) U.S. Cl.
CPC ............ *G06F 3/048* (2013.01); *G06F 3/04842* (2013.01); *G06F 17/30* (2013.01); *G06F 17/30634* (2013.01); *Y10S 715/968* (2013.01)

(58) Field of Classification Search
CPC ....... G06F 17/3064–17/30651; G06F 3/0484; G06F 3/04842; G06F 3/0482; G06F 17/3028; Y10S 715/968

USPC ............... 715/760, 835–845; 707/999.009, 707/999.102, E17.142, 802, 805; 709/201–203, 220–222; 345/335; 705/26.1

See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,778,370 | A * | 7/1998 | Emerson |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,950,193 | A * | 9/1999 | Kulkarni |
| 5,963,953 | A | 10/1999 | Cram et al. |
| 6,064,999 | A * | 5/2000 | Dalal |
| 6,092,083 | A | 7/2000 | Brodersen et al. |

(Continued)

OTHER PUBLICATIONS

U.S. Appl. No. 60/828,192, filed Oct. 4, 2006.

*Primary Examiner* — Nicholas Ulrich

(57) ABSTRACT

In accordance with embodiments, there are provided mechanisms and methods for displaying a record as part of a selected grouping of data, including for example, identifying a record of a multi-tenant on-demand database system, displaying a plurality of actions associated with the record, and displaying the record as part of a selected grouping of data within the system in response to the user selecting an option to view the record as part of a selected grouping included within the table of the record. These mechanisms and methods for displaying a record as part of a selected grouping of data can enable improved data access, simplify and expedite a user's workflow, etc.

20 Claims, 5 Drawing Sheets

(56) References Cited

U.S. PATENT DOCUMENTS

| | | | | |
|---|---|---|---|---|
| 6,112,209 A * | | 8/2000 | Gusack | |
| 6,161,149 A | | 12/2000 | Achacoso et al. | |
| 6,169,534 B1 | | 1/2001 | Raffel et al. | |
| 6,178,425 B1 | | 1/2001 | Brodersen et al. | |
| 6,189,011 B1 | | 2/2001 | Lim et al. | |
| 6,216,135 B1 | | 4/2001 | Brodersen et al. | |
| 6,233,617 B1 | | 5/2001 | Rothwein et al. | |
| 6,266,669 B1 | | 7/2001 | Brodersen et al. | |
| 6,295,530 B1 | | 9/2001 | Ritchie et al. | |
| 6,308,168 B1 * | | 10/2001 | Dovich et al. | |
| 6,324,568 B1 | | 11/2001 | Diec | |
| 6,324,693 B1 | | 11/2001 | Brodersen et al. | |
| 6,336,137 B1 | | 1/2002 | Lee et al. | |
| D454,139 S | | 3/2002 | Feldcamp | |
| 6,367,077 B1 | | 4/2002 | Brodersen et al. | |
| 6,393,605 B1 | | 5/2002 | Loomans | |
| 6,405,220 B1 | | 6/2002 | Brodersen et al. | |
| 6,434,550 B1 | | 8/2002 | Warner et al. | |
| 6,446,089 B1 | | 9/2002 | Brodersen et al. | |
| 6,535,909 B1 | | 3/2003 | Rust | |
| 6,549,908 B1 | | 4/2003 | Loomans | |
| 6,553,563 B2 | | 4/2003 | Ambrose et al. | |
| 6,560,461 B1 | | 5/2003 | Fomukong et al. | |
| 6,574,635 B2 | | 6/2003 | Stauber et al. | |
| 6,577,726 B1 | | 6/2003 | Huang et al. | |
| 6,601,087 B1 | | 7/2003 | Zhu et al. | |
| 6,604,117 B2 | | 8/2003 | Lim et al. | |
| 6,604,128 B2 | | 8/2003 | Diec | |
| 6,609,150 B2 | | 8/2003 | Lee et al. | |
| 6,621,834 B1 | | 9/2003 | Scherpbier et al. | |
| 6,654,032 B1 | | 11/2003 | Zhu et al. | |
| 6,665,648 B2 | | 12/2003 | Brodersen et al. | |
| 6,665,655 B1 | | 12/2003 | Warner et al. | |
| 6,684,438 B2 | | 2/2004 | Brodersen et al. | |
| 6,711,565 B1 | | 3/2004 | Subramaniam et al. | |
| 6,724,399 B1 | | 4/2004 | Katchour et al. | |
| 6,728,702 B1 | | 4/2004 | Subramaniam et al. | |
| 6,728,960 B1 | | 4/2004 | Loomans | |
| 6,732,095 B1 | | 5/2004 | Warshavsky et al. | |
| 6,732,100 B1 | | 5/2004 | Brodersen et al. | |
| 6,732,111 B2 | | 5/2004 | Brodersen et al. | |
| 6,754,681 B2 | | 6/2004 | Brodersen et al. | |
| 6,763,351 B1 | | 7/2004 | Subramaniam et al. | |
| 6,763,501 B1 | | 7/2004 | Zhu et al. | |
| 6,768,904 B2 | | 7/2004 | Kim | |
| 6,772,229 B1 | | 8/2004 | Achacoso et al. | |
| 6,782,383 B2 | | 8/2004 | Subramaniam et al. | |
| 6,804,330 B1 | | 10/2004 | Jones et al. | |
| 6,826,565 B2 | | 11/2004 | Ritchie et al. | |
| 6,826,582 B1 | | 11/2004 | Chatterjee et al. | |
| 6,826,745 B2 | | 11/2004 | Coker et al. | |
| 6,829,655 B1 | | 12/2004 | Huang et al. | |
| 6,842,748 B1 | | 1/2005 | Warner et al. | |
| 6,850,895 B2 | | 2/2005 | Brodersen et al. | |
| 6,850,949 B2 | | 2/2005 | Warner et al. | |
| 7,062,502 B1 | | 6/2006 | Kesler | |
| 7,069,231 B1 | | 6/2006 | Cinarkaya et al. | |
| 7,137,065 B1 * | | 11/2006 | Huang et al. | 715/205 |
| 7,181,758 B1 | | 2/2007 | Chan | |
| 7,209,929 B2 | | 4/2007 | Dominguez, Jr. et al. | |
| 7,233,940 B2 * | | 6/2007 | Bamberger et al. | |
| 7,289,976 B2 | | 10/2007 | Kihneman et al. | |
| 7,340,411 B2 | | 3/2008 | Cook | |
| 7,356,482 B2 | | 4/2008 | Frankland et al. | |
| 7,401,094 B1 | | 7/2008 | Kesler | |
| 7,412,455 B2 | | 8/2008 | Dillon | |
| 7,508,789 B2 | | 3/2009 | Chan | |
| 7,574,652 B2 * | | 8/2009 | Lennon et al. | 715/248 |
| 7,606,819 B2 * | | 10/2009 | Audet | G06F 17/2205 |
| 7,620,655 B2 | | 11/2009 | Larsson et al. | |
| 7,644,361 B2 * | | 1/2010 | Wu et al. | 715/273 |
| 7,680,817 B2 * | | 3/2010 | Audet | G06F 3/0481 707/999.102 |
| 7,698,160 B2 | | 4/2010 | Beaven et al. | |
| 7,756,873 B2 * | | 7/2010 | Gould et al. | 707/737 |
| 8,015,495 B2 | | 9/2011 | Achacoso et al. | |
| 8,082,301 B2 | | 12/2011 | Ahlgren et al. | |
| 8,095,413 B1 | | 1/2012 | Beaven | |
| 8,095,594 B2 | | 1/2012 | Beaven et al. | |
| 8,266,138 B1 * | | 9/2012 | Collins et al. | 707/714 |
| 8,275,836 B2 | | 9/2012 | Beaven et al. | |
| 8,375,014 B1 * | | 2/2013 | Brocato et al. | 707/705 |
| 8,457,545 B2 | | 6/2013 | Chan | |
| 8,473,518 B1 * | | 6/2013 | Yancey et al. | 707/786 |
| 8,484,111 B2 | | 7/2013 | Frankland et al. | |
| 8,812,625 B1 * | | 8/2014 | Chitilian et al. | 709/220 |
| 8,893,046 B2 * | | 11/2014 | Audet | G06F 17/2205 715/721 |
| 2001/0044791 A1 | | 11/2001 | Richter et al. | |
| 2002/0022986 A1 | | 2/2002 | Coker et al. | |
| 2002/0029161 A1 | | 3/2002 | Brodersen et al. | |
| 2002/0029376 A1 | | 3/2002 | Ambrose et al. | |
| 2002/0035577 A1 | | 3/2002 | Brodersen et al. | |
| 2002/0042264 A1 | | 4/2002 | Kim | |
| 2002/0042843 A1 | | 4/2002 | Diec | |
| 2002/0072951 A1 | | 6/2002 | Lee et al. | |
| 2002/0082892 A1 | | 6/2002 | Raffel et al. | |
| 2002/0129352 A1 | | 9/2002 | Brodersen et al. | |
| 2002/0140731 A1 | | 10/2002 | Subramaniam et al. | |
| 2002/0143997 A1 | | 10/2002 | Huang et al. | |
| 2002/0162090 A1 | | 10/2002 | Parnell et al. | |
| 2002/0165742 A1 | | 11/2002 | Robins | |
| 2003/0004971 A1 | | 1/2003 | Gong et al. | |
| 2003/0018705 A1 | | 1/2003 | Chen et al. | |
| 2003/0018830 A1 | | 1/2003 | Chen et al. | |
| 2003/0066031 A1 | | 4/2003 | Laane | |
| 2003/0066032 A1 | | 4/2003 | Ramachandran et al. | |
| 2003/0069936 A1 | | 4/2003 | Warner et al. | |
| 2003/0070000 A1 | | 4/2003 | Coker et al. | |
| 2003/0070004 A1 | | 4/2003 | Mukundan et al. | |
| 2003/0070005 A1 | | 4/2003 | Mukundan et al. | |
| 2003/0074418 A1 | | 4/2003 | Coker | |
| 2003/0120675 A1 | | 6/2003 | Stauber et al. | |
| 2003/0151633 A1 | | 8/2003 | George et al. | |
| 2003/0159136 A1 | | 8/2003 | Huang et al. | |
| 2003/0187921 A1 | | 10/2003 | Diec | |
| 2003/0189600 A1 | | 10/2003 | Gune et al. | |
| 2003/0204427 A1 | | 10/2003 | Gune et al. | |
| 2003/0206192 A1 | | 11/2003 | Chen et al. | |
| 2003/0225730 A1 | | 12/2003 | Warner et al. | |
| 2003/0233404 A1 | | 12/2003 | Hopkins | |
| 2004/0001092 A1 | | 1/2004 | Rothwein et al. | |
| 2004/0010489 A1 | | 1/2004 | Rio | |
| 2004/0015783 A1 * | | 1/2004 | Lennon et al. | 715/523 |
| 2004/0015981 A1 | | 1/2004 | Coker et al. | |
| 2004/0027388 A1 | | 2/2004 | Berg et al. | |
| 2004/0128001 A1 | | 7/2004 | Levin et al. | |
| 2004/0181542 A1 * | | 9/2004 | Mullins | 707/102 |
| 2004/0181543 A1 * | | 9/2004 | Wu et al. | 707/102 |
| 2004/0186860 A1 | | 9/2004 | Lee et al. | |
| 2004/0193510 A1 | | 9/2004 | Catahan, Jr. et al. | |
| 2004/0199489 A1 | | 10/2004 | Barnes-Leon et al. | |
| 2004/0199536 A1 | | 10/2004 | Barnes Leon et al. | |
| 2004/0199537 A1 * | | 10/2004 | Duff | 707/102 |
| 2004/0199543 A1 | | 10/2004 | Braud et al. | |
| 2004/0249854 A1 | | 12/2004 | Barnes-Leon et al. | |
| 2004/0260534 A1 | | 12/2004 | Pak et al. | |
| 2004/0260659 A1 | | 12/2004 | Chan et al. | |
| 2004/0268299 A1 | | 12/2004 | Lei et al. | |
| 2005/0050555 A1 | | 3/2005 | Exley et al. | |
| 2005/0065925 A1 | | 3/2005 | Weissman et al. | |
| 2005/0091098 A1 | | 4/2005 | Brodersen et al. | |
| 2005/0108280 A1 * | | 5/2005 | Kagle et al. | 707/103 R |
| 2005/0223022 A1 * | | 10/2005 | Weissman et al. | 707/102 |
| 2005/0283478 A1 * | | 12/2005 | Choi et al. | 707/9 |
| 2006/0021019 A1 | | 1/2006 | Hinton et al. | |
| 2006/0143563 A1 * | | 6/2006 | Sauermann | 715/526 |
| 2006/0206834 A1 | | 9/2006 | Fisher et al. | |
| 2007/0214169 A1 * | | 9/2007 | Audet | G06F 17/2205 |
| 2007/0216694 A1 * | | 9/2007 | Audet | G06F 3/0481 345/522 |
| 2008/0046803 A1 * | | 2/2008 | Beauchamp et al. | 715/212 |

(56) References Cited

U.S. PATENT DOCUMENTS

| | | | |
|---|---|---|---|
| 2008/0172628 A1* | 7/2008 | Mehrotra et al. | 715/771 |
| 2008/0249972 A1 | 10/2008 | Dillon | |
| 2009/0055726 A1* | 2/2009 | Audet | G06F 17/30994 715/234 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0005055 A1* | 1/2010 | An et al. | 707/2 |
| 2010/0082568 A1* | 4/2010 | Lee et al. | 707/705 |
| 2010/0131899 A1* | 5/2010 | Hubert | G06F 17/30917 715/823 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |

\* cited by examiner

SYSTEM, METHOD AND COMPUTER PROGRAM PRODUCT FOR DISPLAYING A RECORD AS PART OF A SELECTED GROUPING OF DATA

CLAIM OF PRIORITY

This application claims the benefit of U.S. Provisional Patent Application 61/311,705, entitled "Method to allow a user to choose a way to view a record," by Elena Schneider, filed Mar. 8, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to accessing records, and more particularly to performing one or more actions associated with the records.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional systems, it may be desirable to perform actions on records within the system. For example, an entity may desire to open a record within the system, alter one or more characteristics of the record within the system, etc. Unfortunately, conventional accessing of records has been associated with various limitations.

Just by way of example, traditional methods of accessing a record within a particular context (e.g., accessing one or more objects containing the record) in the system may involve manually searching the context within the system (e.g., manually looking through one or more objects for the record). For example, when a user desires to view a record in a contact context, they may need to access a contacts tab in a user interface, find the record within the contacts object, and select the record from within the object. Additionally, if the user wants to determine related lists that the record appears on, they need to individually access all other objects to look for the record. Accordingly, it is desirable to provide techniques that simplify record access.

BRIEF SUMMARY

In accordance with embodiments, there are provided mechanisms and methods for performing an action associated with a record. These mechanisms and methods for performing an action associated with a record can enable improved data access, simplify and expedite a user's workflow, etc.

In an embodiment and by way of example, a method for performing an action associated with a record is provided. In one embodiment, a record of a multi-tenant on-demand database system is identified. Additionally, one or more actions associated with the record are displayed. Further, one of the actions associated with the record are performed, based on a selection of one of the actions.

While one or more implementations and techniques are described with reference to an embodiment in which enabling an aspect required with respect to code to be installed within a multi-tenant on-demand database system is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for performing an action associated with a record.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for performing an action associated with a record will be described with reference to example embodiments.

Figure 1:
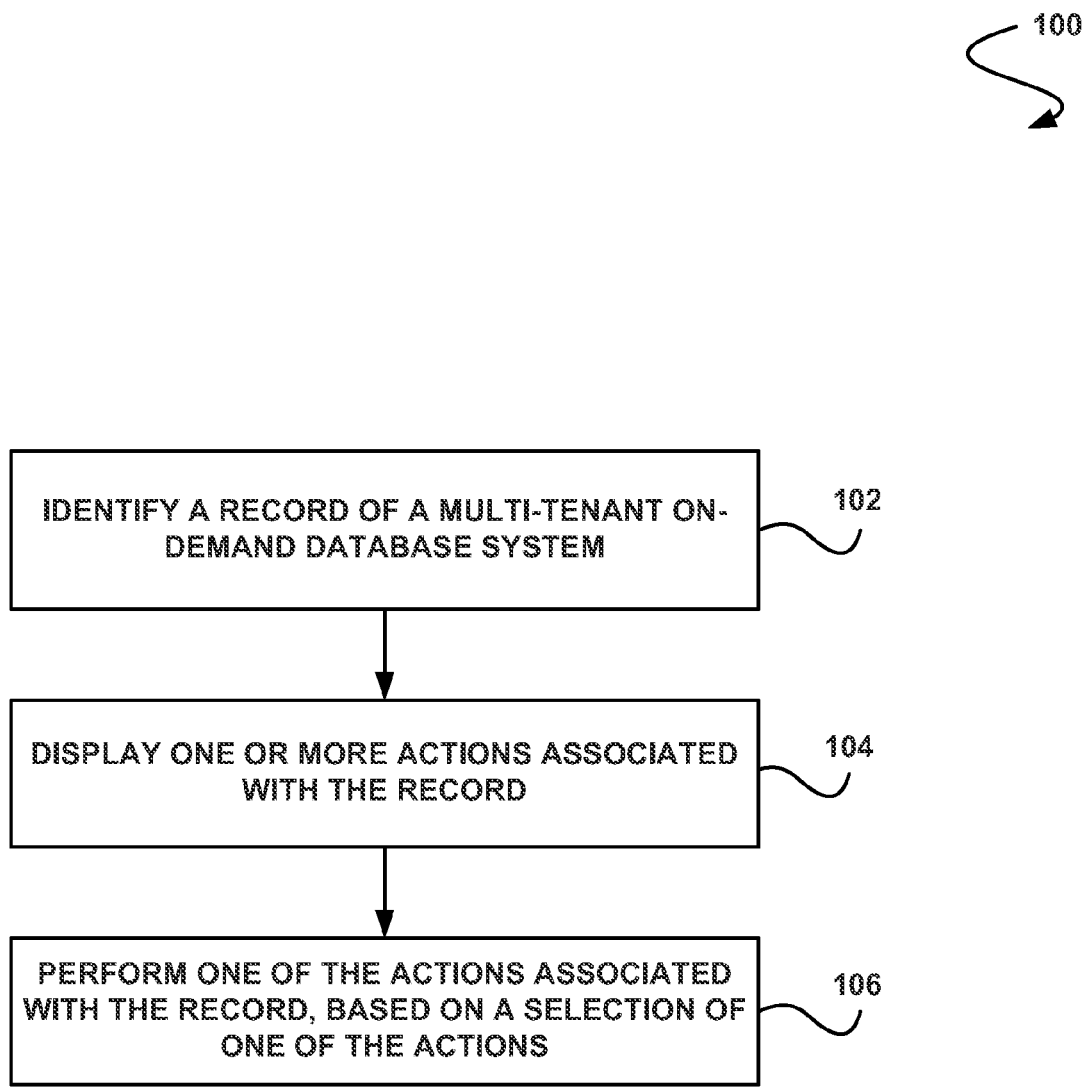
FIG. 1 illustrates a method for performing an action associated with a record, in accordance with one embodiment.

FIG. 1 illustrates a method 100 for performing an action associated with a record, in accordance with one embodiment. As shown in operation 102, a record of a multi-tenant on-demand database system is identified. In one embodiment, the record may include any data utilized within the database system. For example, the record may be representative of an individual, an article of manufacture, a company, a sales summary, etc. In another embodiment, the record may include an identifier. For example, the record may have a name, an identification number, or any associated data that identifies the record. In yet another embodiment, the record may be associated with one or more contexts of the system. As a result, the record may be able to be viewed in one or more contexts (e.g., one or more listings, groupings, summaries, etc. within the system). For instance, in a customer relationship management ("CRM") system, "John Smith" may be in the CRM system as a lead and a contact, and as such, may be listed in situations where other leads and/or contacts are listed. For example, in one context a user performs a search for leads with the name "Smith", John Smith may be one of the listed leads in the search results. In another context, John Smith may be grouped with other contacts on a page displaying all contacts in the CRM system. In these and other examples, John Smith may be associated with other contexts.

In another embodiment, the record may be associated with one or more objects of the system. For example, the one or more objects of the system may provide a context in which the record is accessed (e.g., viewed, analyzed, etc.) within the system. For instance, the one or more object may include one or more of a collection (e.g., a list, etc.) of a particular employment position within the system (e.g., a collection of leads, etc.), a collection of contacts within the system, a collection of accounts within the system, a collection of opportunities within the system, etc., and the record may be included within the collection. In another embodiment, the record may appear in related lists of the one or more objects. For example, the record may include a "John Smith" system record that is a lead (and is therefore associated with a lead object), a contact (and is therefore associated with a contact object), etc., and may also be associated with an account object and an opportunity object.

In yet another embodiment, identifying the record may include selecting the record. For example, a user may select the record utilizing a graphical user interface. Additionally, in another embodiment, the record may be accessed through one or more areas of the system. For example, the record may be accessed by selecting one or more tabs associated with the system, viewing one or more system windows, pages, etc. associated with the record (e.g., containing an instance of the record etc.), etc.

It should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further, as shown in operation 104, one or more actions associated with the record are displayed. In one embodiment, the one or more actions associated with the record may include one or more actions that can be performed within the system utilizing the record. For example, the one or more actions may include viewing the record in a particular context (e.g., viewing the record in the context of a contact, the context of a lead, the context of a related list, etc.). Additionally, in one embodiment, the one or more actions may include performing an action on the record. For example, the action may include building a chart utilizing the record, performing one or more calculations on the record, adding a record to an object (e.g., adding a contact to an opportunity, etc)., etc.

In another embodiment, displaying the one or more actions may be performed by accessing metadata associated with the record. For example, metadata that describes one or more objects that are associated with the record and/or one or more contexts in which a record can be viewed may be stored in association with the record and may be accessed in order to display the one or more actions associated with the record. In this way, a list of objects that have metadata describing the record may be provided.

Further still, in one embodiment, the one or more actions associated with the record may be displayed to the user in response to the selection of the record by the user. For example, the one or more actions associated with the record may be displayed to the user in response to the user selecting the record utilizing a graphical user interface (e.g., right clicking on an icon associated with the record, hovering a cursor over the icon associated with the record, inputting one or more keystrokes on a keyboard, etc.).

Further still, as shown in operation 106, one of the actions associated with the record is performed, based on a selection of one of the actions. In one embodiment, the user may select one of the displayed actions associated with the record. In this way, the action associated with the record may be performed quickly and efficiently through access of the record itself, thereby minimizing time-consuming navigation through an interface of the system (e.g., clicking on tabs, windows, etc.). Additionally, the record may be used as a tool to access relevant information associated with the record, instead of treating the record as a static entity.

Figure 2:
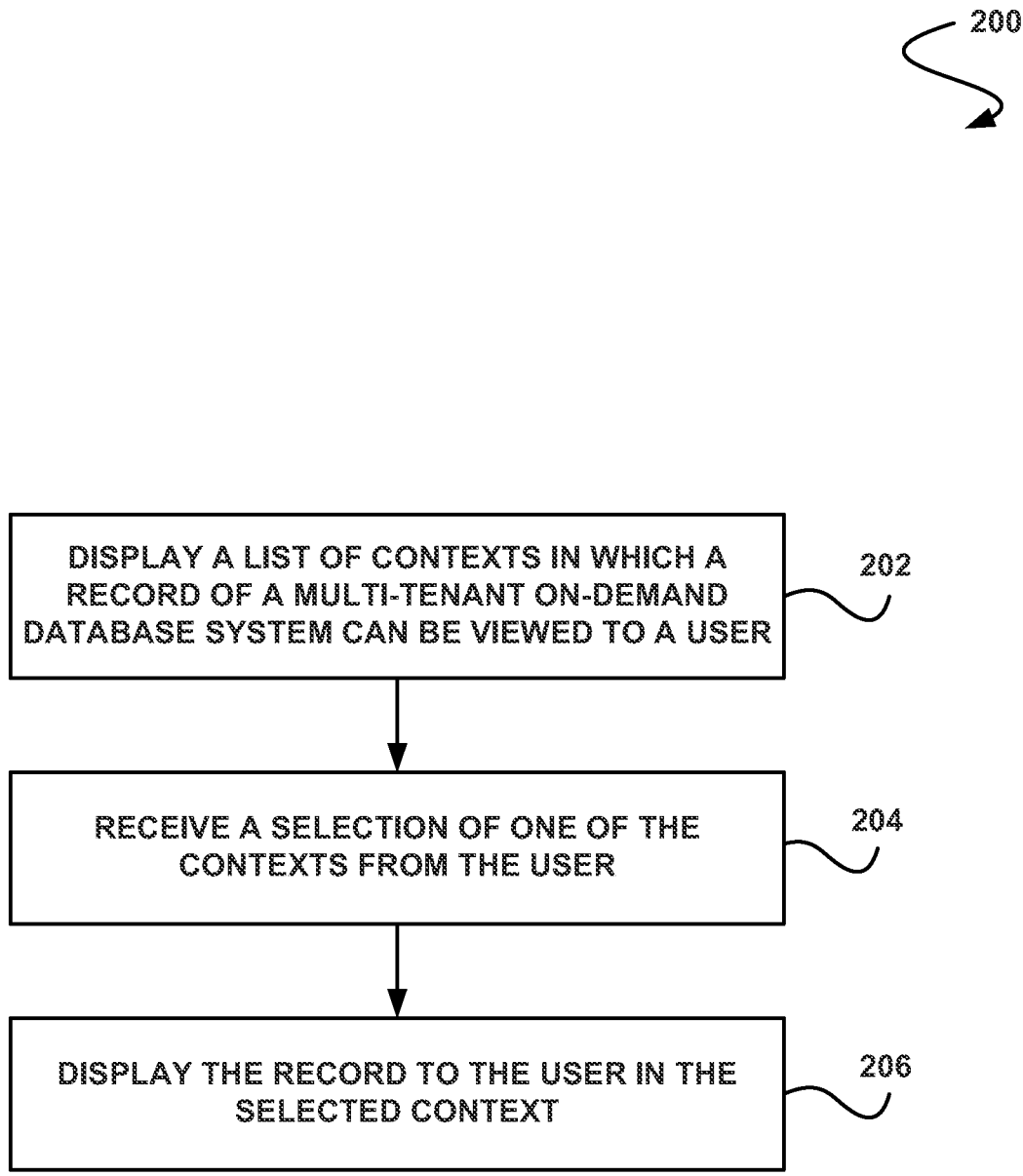
FIG. 2 illustrates a method for displaying a record to a user in a selected context, in accordance with another embodiment.

FIG. 2 illustrates a method 200 for displaying a record to a user in a selected context, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a list of contexts in which a record of a multi-tenant, on-demand database system can be viewed is displayed to a user. In one embodiment, the list of contexts may be displayed in response to the user selecting the record (e.g., right clicking on the record, displaying a right click menu, etc.). In another embodiment, the list of contexts may be displayed in response to the user selecting a link (e.g., an action link associated with the record, etc.). For example, the user may click on an action link in a list view to enable a view of all relevant information for the record.

In yet another embodiment, the list of contexts may include only those contexts in which the record is present. For example, the list of contexts may include accounts, opportunities, campaigns, and any other objects that include the record. More specifically, the list of contexts may include one or more options to view the record within a particular object or other grouping (e.g., to view the record as part of a particular object, as part of a particular group, list, etc.).

Additionally, as shown in operation 204, a selection of one of the contexts is received from the user. For example, the user may select one of the contexts on the list, and a query may then be sent including metadata associated with the selected context, the current record, etc. Further, as shown in operation 206, the record is displayed to the user in the context selected by the user. For example, if the user selects a context of which opportunities the record belongs to, then a window illustrating opportunities associated with the record may be displayed to the user.

In this way, the user may be able to dictate how they would like to view the entity by going through the entity itself, instead of navigating through one or more tabs of the system, windows of the system, contexts of the system, etc. Additionally, the user may be able to efficiently and easily select a context associated with a related record.

Figure 3:
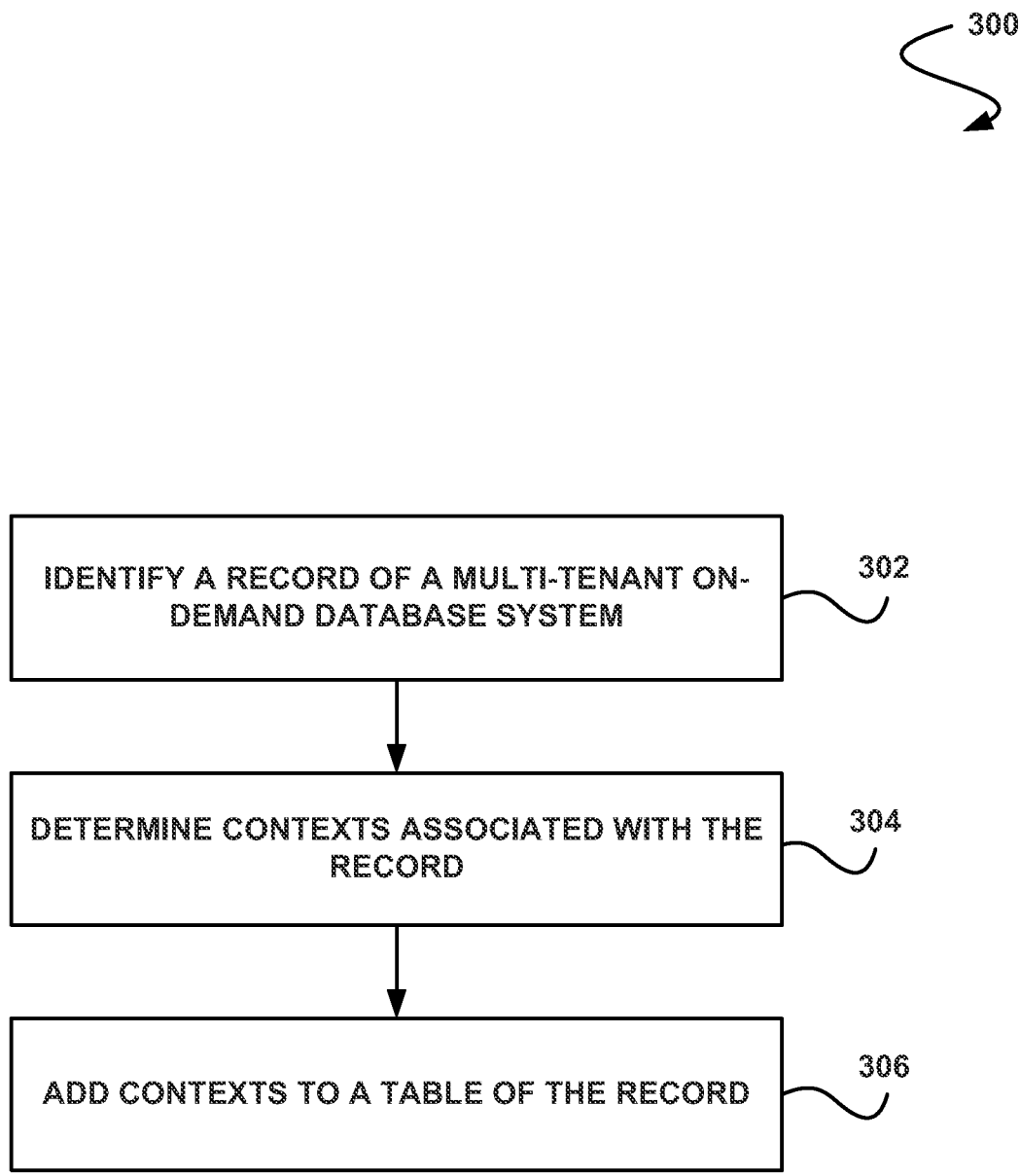
FIG. 3 illustrates a method for implementing record based viewing, in accordance with yet another embodiment.

FIG. 3 illustrates a method 300 for implementing record based viewing, in accordance with another embodiment. As an option, the present method 300 may be carried out in the context of the functionality of FIGS. 1-2. Of course, however, the method 300 may be carried out in any desired environment. The aforementioned definitions may apply during the present description.

As shown in operation 302, a record of a multi-tenant, on-demand database system is identified. Additionally, as shown in operation 304, contexts associated with the record (e.g., contexts in which the record is to be displayed, etc.) are determined. Further, as shown in operation 306, the contexts associated with the record are added to a table of the record. In one embodiment, each record may have its own associated table with columns describing each context that the record belongs to. In another embodiment, the contexts associated with the record may include metadata.

In another embodiment, if the record is added to a different context, the context to which the record is added may in turn be added to the table of the record. In this way, the table of the record may refer to the single record, which may avoid the need for reviewing a table for each context in order to determine whether the record exists on the table for a particular context. Additionally, the table of the record may eliminate the need for duplication by avoiding the existence of the record in each associated context table. In another embodiment, tables for each context may exist, and one or more foreign keys may be added to the record table from context tables associated with the record.

System Overview

Figure 4:
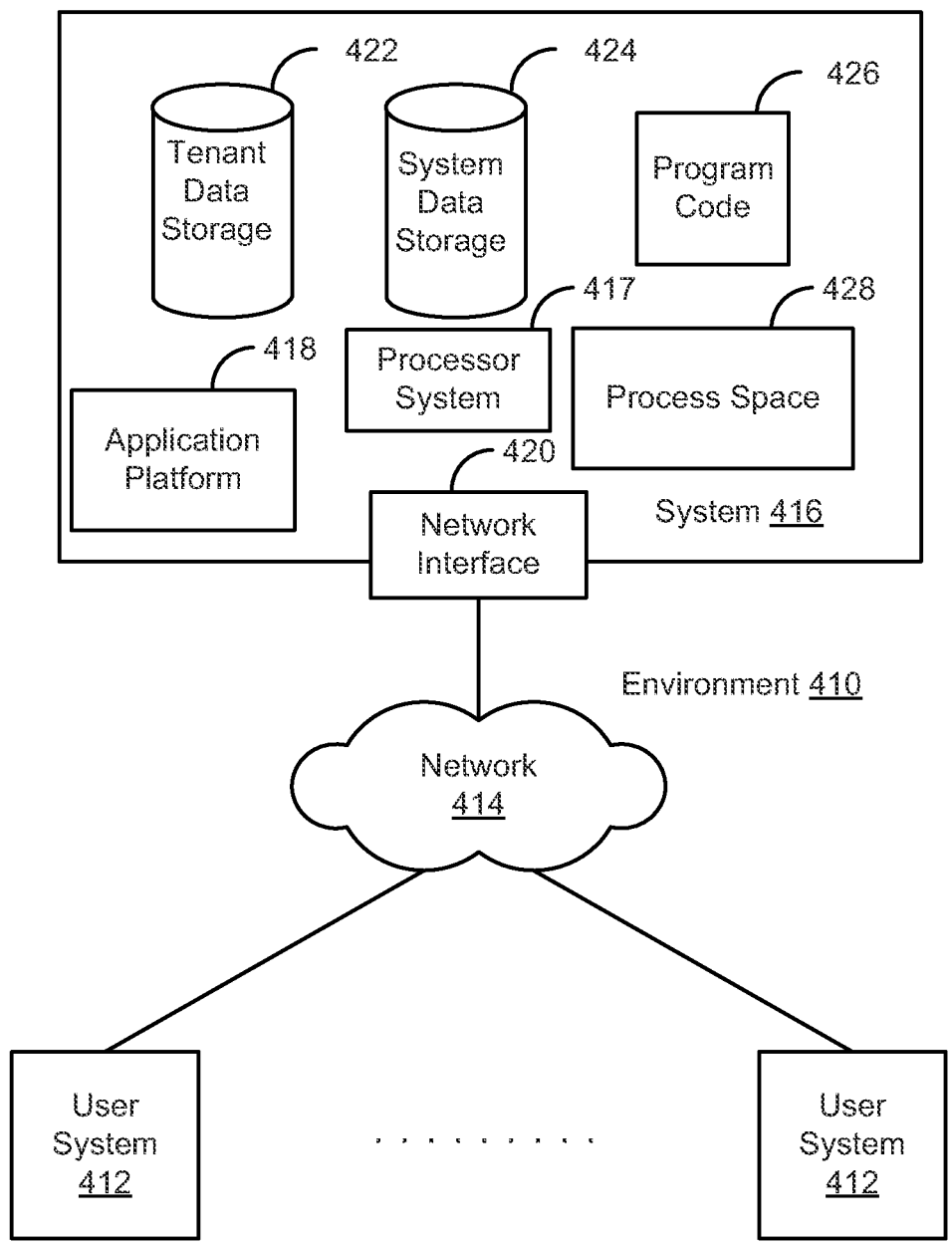
FIG. 4 illustrates a block diagram of an example of an environment wherein an on-demand database system might be used.

FIG. 4 illustrates a block diagram of an environment 410 wherein an on-demand database system might be used. Environment 410 may include user systems 412, network 414, system 416, processor system 417, application platform 418, network interface 420, tenant data storage 422, system data storage 424, program code 426, and process space 428.

In other embodiments, environment 410 may not have all of the components listed and/or may have other elements instead of, or in addition to, those listed above.

Environment 410 is an environment in which an on-demand database system exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database system, which is system 416.

An on-demand database system, such as system 416, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database system 416 may include an application platform 418 that enables creation, managing and executing one or more applications developed by the provider of the on-demand database system, users accessing the on-demand database system via user systems 412, or third party application developers accessing the on-demand database system via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
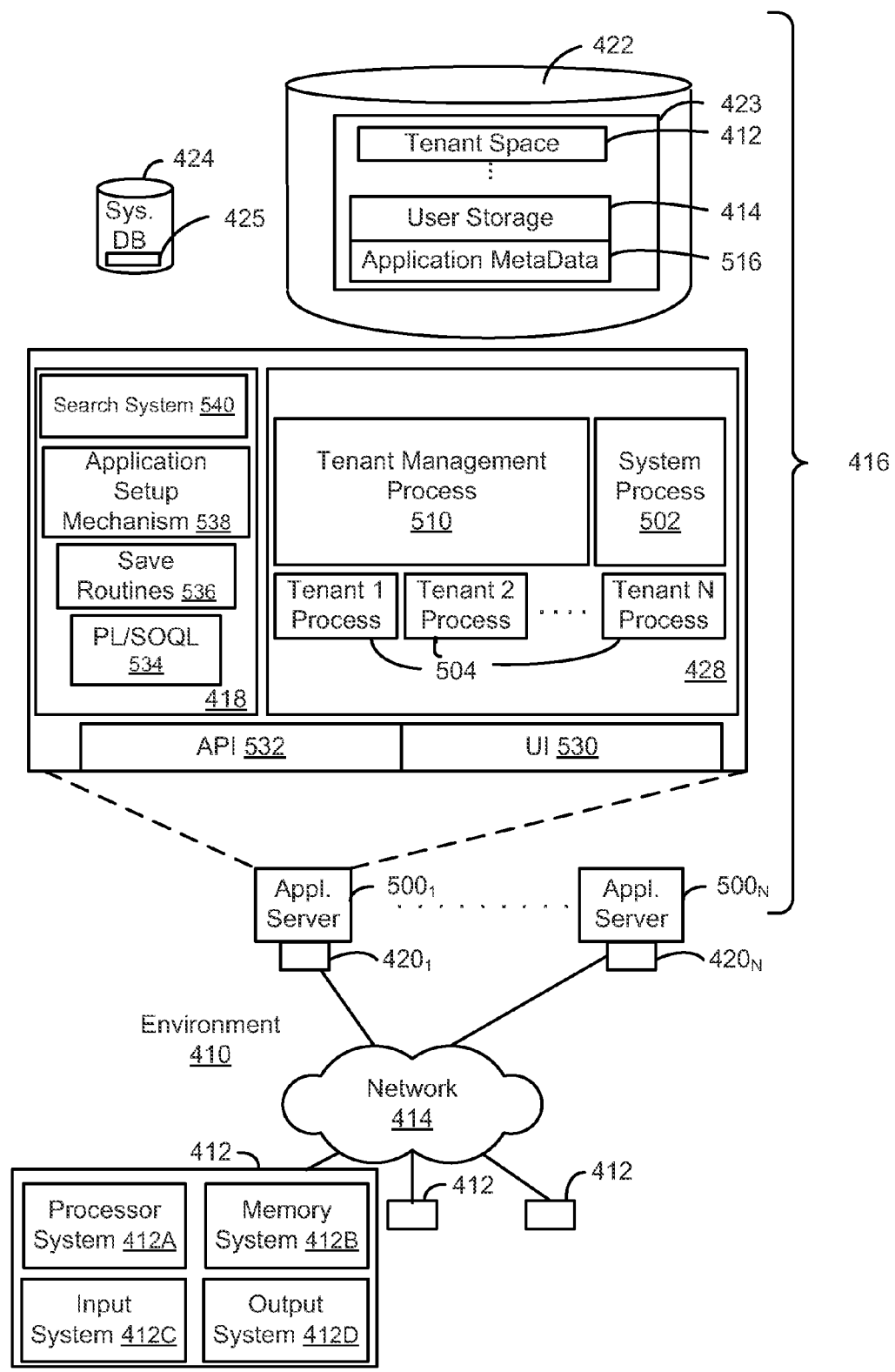
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $\mathbf{500}_1$-$\mathbf{500}_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $\mathbf{500}_1$ might be coupled via the network 414 (e.g., the Internet), another application server $\mathbf{500}_{N-1}$ might be coupled via a direct network link, and another application server $\mathbf{500}_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, the computer program product including instructions adapted to be executed by a computer to cause the computer to perform operations comprising:
   storing, in a database system, a plurality of records that includes a first record that is associated with a plurality of different contexts, each of which permits a different view of information in the first record;
   storing, in the database system, a table associated with the first record that identifies the plurality of different contexts;
   receiving, by the database system, a selection of the first record;
   based on the information in the table, providing, by the database system to a client computer, information identifying a set of actions associated with the first record, wherein the information identifying the set of actions is displayable by the client computer to a user of the database system, and wherein the set of actions includes actions corresponding to at least two of the plurality of different contexts associated with the first record;
   receiving, by the database system, an indication of one of the set of actions that corresponds to a particular one of the plurality of different contexts and
   providing, by the database system according to the indicated action, data to the client computer that is usable to display a view of information in the first record according to the particular context.

2. The computer program product of claim 1, wherein the selection is received via a graphical user interface.

3. The computer program product of claim 1, wherein the set of actions includes adding the first record to an object.

4. The computer program product of claim 1, wherein the set of actions includes building a chart utilizing the first record.

5. The computer program product of claim 1, wherein the set of actions includes performing one or more calculations on the first record.

6. The computer program product of claim 1, wherein the plurality of different contexts includes one or more objects within which to view the first record.

7. The computer program product of claim 6, wherein the one or more objects include one or more of the following objects: account, opportunity, contact, campaign.

8. A method, comprising:
   storing, in a database system, a plurality of records that includes a first record that is associated with a plurality of different contexts, each of which permits a different view of information in the first record;
   storing, in the database system, a table associated with the first record that identifies the plurality of different contexts;
   receiving, by the database system, a selection of the first record;
   based on the information in the table, providing, by the database system to a client computer, information identifying a set of actions associated with the first record, wherein the information identifying the set of actions is displayable by the client computer to a user of the database system, and wherein the set of actions includes actions corresponding to at least two of the plurality of different contexts associated with the first record;
   receiving, by the database system, an indication of one of the set of actions that corresponds to a particular one of the plurality of different contexts and
   providing by the database system according to the indicated action, data to the client computer that is usable to display a view of information in the first record according to the particular context.

9. The method of claim 8, further comprising:
   responsive to the first record being added to an additional context, storing in the table information identifying the additional context.

10. The method of claim 9, further comprising updating the data provided to the client computer in response to the first record being added to an additional context.

11. The method of claim 8, wherein the database system is a multi-tenant database system.

12. The method of claim 8, wherein the selection of the first record is received via a graphical user interface.

13. The method of claim 12, wherein the selection includes an indication that an icon associated with the first record has been selected.

14. The method of claim 12, wherein the providing to the client computer information identifying the set of actions associated with the first record is performed in response to the receiving the selection of the first record via the graphical user interface.

15. A non-transitory computer-readable medium having computer instructions stored thereon that are capable of causing operations comprising:
   storing in a database system a plurality of records that includes a first record that is associated with a plurality of different contexts, each of which includes one or more objects within which to view the first record;
   storing in the database system a table associated with the first record that identifies the plurality of different contexts;
   receiving a selection of the first record;
   based on the information in the table, providing to a client computer information identifying a set of actions associated with the first record, wherein the information identifying the set of actions is displayable by the client computer to a user of the database system, and wherein the set of actions includes actions corresponding to at least two of the plurality of different contexts associated with the first record;
   receiving an indication of one of the set of actions that corresponds to a particular one of the plurality of different contexts; and
   providing, according to the indicated action, data to the client computer that is usable to display a view of information in the first record according to the particular context.

16. The non-transitory computer-readable medium of claim 15, wherein the set of actions includes adding the first record to an object.

17. The non-transitory computer-readable medium of claim 16, wherein the indicated one of the set of actions is viewing the first record in the context of a contact.

18. The non-transitory computer-readable medium of claim 15, wherein the indicated one of the set of actions is adding the first record to an additional context and wherein the operations further comprise updating the table associated with the first record with information that identifies the additional context.

19. The non-transitory computer-readable medium of claim 18, wherein the data provided to the client computer is usable to display a view of information in the first record in the additional context.

20. The non-transitory computer-readable medium of claim 15, wherein the providing to the client computer information identifying the set of actions associated with the first record is performed in response to the receiving the selection of the first record.

* * * * *